United States Patent [19]

Morimoto et al.

[11] 4,025,335

[45] May 24, 1977

[54] METHOD FOR THE RECOVERY OF USEFUL METALLIC COMPONENTS

[75] Inventors: Toru Morimoto, Ichikawa; Kenji Matsuzawa, Yokohama, both of Japan

[73] Assignee: Nippon Dia Clevite Co., Ltd., Narashino, Japan

[22] Filed: Nov. 13, 1975

[21] Appl. No.: 631,616

[30] Foreign Application Priority Data

Nov. 20, 1974  Japan .............................. 49-133822

[52] U.S. Cl. ............................................... 75/135
[51] Int. Cl.$^2$ .......................................... C22C 1/00
[58] Field of Search ............... 75/63, 68 R, 68, 77, 75/85, 72, 135

[56] References Cited

UNITED STATES PATENTS 1,957,837   5/1934   Kern ...................................... 75/63

FOREIGN PATENTS OR APPLICATIONS 741,108   11/1955   United Kingdom .................... 75/63

*Primary Examiner*—M. J. Andrews
*Attorney, Agent, or Firm*—McNenny, Pearne, Gordon, Gail, Dickinson & Schiller

[57] ABSTRACT

Disclosed is a method for the recovery of useful metallic components such as lead, tin, copper, etc. from a closely layered member having its surface layer of copper or a copper or aluminum alloy closely layered on a back metal of steel or the like. The closely layered member is immersed in molten aluminum to dissolve therein the surface layer to separate it from the back metal, by which lead and/or tin is gathered under a molten aluminum or aluminum-copper layer and separated therefrom.

1 Claim, 4 Drawing Figures

METHOD FOR THE RECOVERY OF USEFUL METALLIC COMPONENTS

BACKGROUND OF THE INVENTION

1. Field of the Invention

This invention relates to a method for the recovery of useful metallic components, and more particularly to a method for the recovery of useful metallic components such as lead, tin, copper, etc. from a closely layered member having its surface layer of copper or a copper or aluminum alloy closely layered on a back metal such as a steel plate or the like.

2. Description of the Prior Art

Heretofore, a closely layered member having its surface layer of copper or a copper or aluminum alloy closely layered on a back metal such as a steel plate or the like has been employed for bearings of vehicles and the like. In such bearings, metallic components such as tin, lead, copper, etc. are added as alloying elements of the surface layer to provide for improved mechanical and chemical properties of the bearings and enhanced lubrication thereof.

The bearings are produced by stamping such a sheet-shaped, closely layered material into a predetermined shape. Therefore, in the fabrication of such bearings, many chips and scraps result from stamping and expensive metallic components such as lead, tin, copper, etc. are contained in the scraps. Since such chips and scraps contain large amounts of tin, copper, etc. as mentioned about, the recovery of these metallic components is usually carried out. However, a conventional method of recovery presents serious problems from the viewpoints of its equipment and health of laborers.

The chips and scraps are also layered members composed of a back metal as of steel and an aluminum alloy containing tin, copper, etc. and layered on the back metal, as is evident from the above. The back metal, that is, steel, is separated from the aluminum alloy and retained for later use. With a conventional method, lead is heated up to at least 926° C, for example, in a crucible to provide a lead bath. Then, chips and scraps such as mentioned above are put in the lead bath, by which the copper alloy is dissolved, and then the back metal of steel, which is not dissolved in the lead bath, is taken out therefrom. Thus, the steel can be recovered with ease. On the other hand, the components of the copper alloy dissolved in the lead bath separate in layers due to the difference of their specific gravity. Namely, copper gathers in the upper part of the lead bath and lead and tin gather in the form of solid solution in the lower part. In such a case, however, the metallic components separated in layers cannot be recovered in the form of liquid, so that they are recovered in solid form after cooled, but the crucible must be broken for each recovery.

Further, since the melting point of lead is as high as 926° C, lead evaporates during the recovery and, since the work is carried out under high-temperature condition, it is difficult and presents serious problems from the viewpoint of health of workers.

Moreover, a crucible of graphite is employed because of high temperature but even such a crucible is readily eroded by lead to introduce the possibilities such as blow-out of the liquid metal during the operation.

SUMMARY OF THE INVENTION

Accordingly, this invention is to provide a method of efficiently separating and recovering useful metallic components such as copper, lead, tin, etc. from the chips and scraps resulting from the fabrication of such bearings.

Briefly stated, in accordance with this invention, the metallic components such as tin, lead, etc. added as alloying elements to the basic materials such as copper, aluminum, etc. are separated and recovered from the basic materials by taking advantage of the differences in the metallurgical and chemical properties of them and, on the other hand, copper is dissolved in aluminum and recovered in the form of an aluminum-copper solid solution.

DESCRIPTION OF THE PREFERRED EMBODIMENTS

The method of this invention will hereinafter be described in detail.

The method of this invention starts with melting of pieces of aluminum by heating them, for example, up to 700° C or so in a crucible or the like. Then, chips and scraps resulting from the fabrication of bearings are put in the molten aluminum maintained at about 700° C. In this case, the surface layer portion composed of copper or a copper or aluminum alloy is dissolved in the molten aluminum but the back metal as of steel is not dissolved. Then, the back metal is taken out from the vessel. Thus, the back metal and the surface layer portion can be easily separated from each other.

In the molten aluminum, aluminum of the surface layer portion is dissolved as it is and copper is dissolved in the form of a solid solution in the molten aluminum to form an aluminum-copper solid solution but lead and tin are separated from the molten alumimum above a predetermined temperature.

Figure 3:
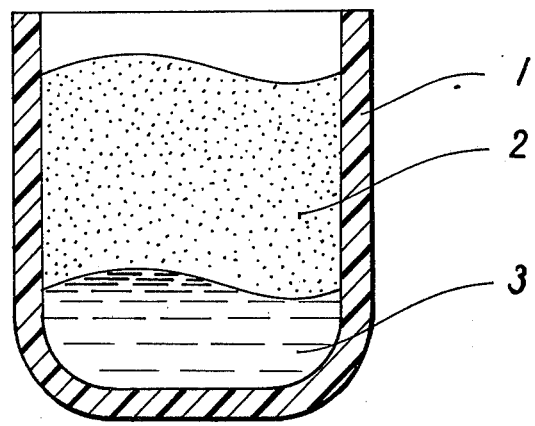
FIG. 3 and 4 are diagrams explantory of one example of the method of this invention.

Consequently, since the specific gravity of the metallic components such as lead and tin is larger than that of aluminum, such metallic components precipitate under the molten aluminum-copper layer, as shown, for example, in FIG. 3 in which molten aluminum or aluminum-copper layer 2 is formed at the upper part of a crucible 1 and a molten tin and/or lead layer 3 is formed under the layer 2.

In the case where copper gradually dissolved in the molten aluminum as mentioned above, it is necessary to raise the temperature of the molten aluminum as the solubility of copper increases. In this case, it is sufficient only to adjust the temperature on the basis of the aluminum-copper phase diagram shown in FIG. 1.

Further, where the molten aluminum or aluminum-copper layer 2 and the molten tin and/or lead layer 3 are separated from each other as shown in FIG. 3, since the solidifying temperature of the molten layer 2 is higher than that of the other molten layer 3, if the both layers are cooled down to a predetermined temperature, only the molten layer 2 is solidified. Therefore, by removing the layer 2 thus solidified, tin or lead or tin and lead can be readily separated and recovered.

As has been described in the foregoing, the method of this invention is to separate and recover the useful metallic components such as lead, copper, etc., through the use of the molten aluminum. The theoretical ground thereof is as follows.

Figure 1:
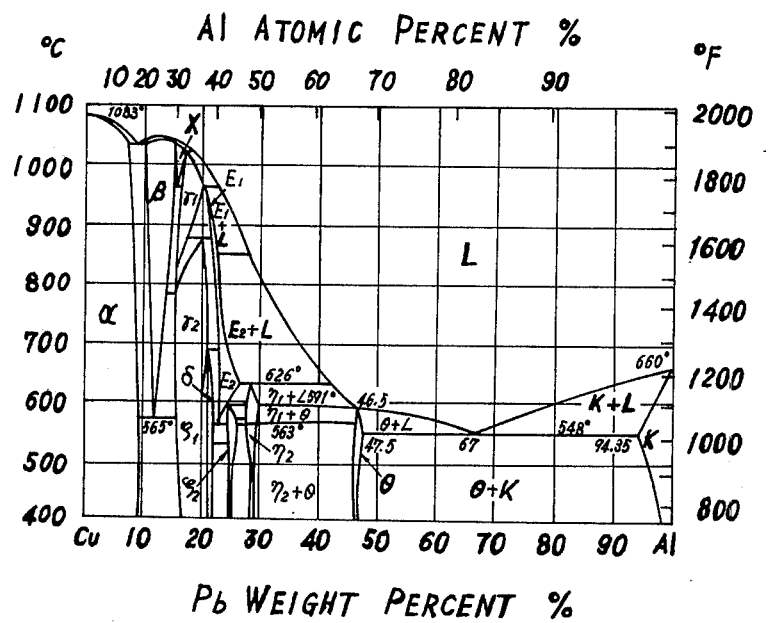
FIG. 1 is a phase diagram of an aluminum-copper.

Namely, as is evident from the aluminum-copper phase diagram shown in FIG. 1, pure aluminum is molten at 660° C. Then, copper is dissolved in aluminum, the liquidus lowers as the amount of copper dissolved increases, so that copper is extremely soluble. However, when the solubility of copper further increases to exceed the vicinity of aluminum-copper (60%), the liquidus rises. Accordingly, by raising the temperature of the molten aluminum or previously maintaining it at, for example, about 1000° C, copper can be dissolved in an amount of 80% relative to the molten aluminum.

Figure 2:
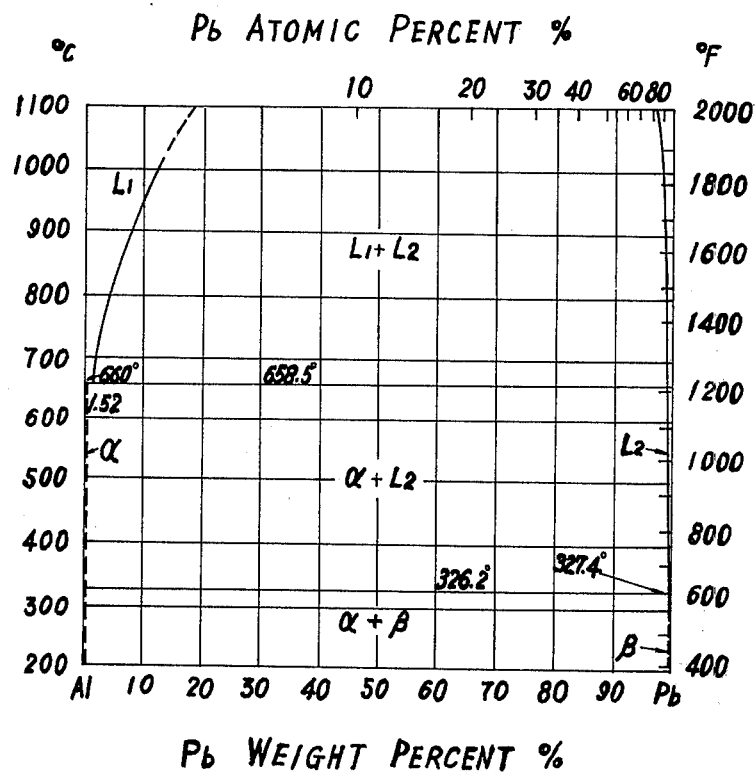
FIG. 2 is a phase diagram of an aluminum-lead.

Moreover, of the useful metallic components contained in the bearing, lead is divided into two phases $L_1$, and $L_2$ above 658° C as depicted in the aluminum-lead phase diagram of FIG. 2. The phase $L_2$ is a lead rich phase, so that when the molten aluminum is held at a temperature above 658° C, lead can be separated in the manner shown in FIG. 3. Likewise, tin can also be separated above the aforesaid temperature.

Further, lead, tin, etc. are separated and precipitated under molten aluminum layer but this is due to the difference in the specific gravity of them. By the way, aluminum has a specific gravity of 2.7g/cm$^3$ and lead has a specific gravity of 11.34g/cm$^3$.

The invention will hereinafter be described in connection with its examples.

EXAMPLE 1

After 2.3kg of aluminum pieces were put in a crucible, the crucible was gradually heated. The aluminum in the crucible was completely molten at about 700° C. In this case, the surface of the molten aluminum was oxidized to form a thin oxide film, by which the molten aluminum was preferably shielded from oxygen in the air.

Next, the molten aluminum was deoxidized and the oxide film was removed, after which a slide bearing formed of a copper alloy composed of 75wt% of copper, 24wt% of lead and 1wt% of tin and a back metal of steel was put in the molten aluminum. As a result of this, the copper alloy was dissolved in about 24 seconds, so that the undissolved back metal was taken out from the molten aluminum. Thus, the back metal was recovered first.

In a similar manner, slide bearings were put in the molten aluminum one after another to separate the copper alloy and the back metal from each other.

After such operations, the molten metal in the crucilbe was divided in layers as shown in FIG. 3 and the useful metallic components could be completely separated.

Further, when the temperature of the molten aluminum was raised up to 800° C, 900° C and 1000° C, the results were the same as those in the case of 700° C but, in the cases of a temperature higher than 900° C, the thickness of the oxide film increased and the amount of a degassing agent consumed for degassing increased remarkedly.

EXAMPLE 2

As is the case with Example 1, aluminum pieces were put in a crucible, which was heated at a temperature ranging from 700 to 800° C. In the molten aluminum, a slide bearing composed of an aluminum alloy containing 75wt% of aluminum and 20wt% of tin and a back metal of steel was put. As a result of this, the aluminum alloy was dissolved in about 5 seconds but the back metal was not dissolved. Then, the back metal was taken out from the crucible.

Figure 4:
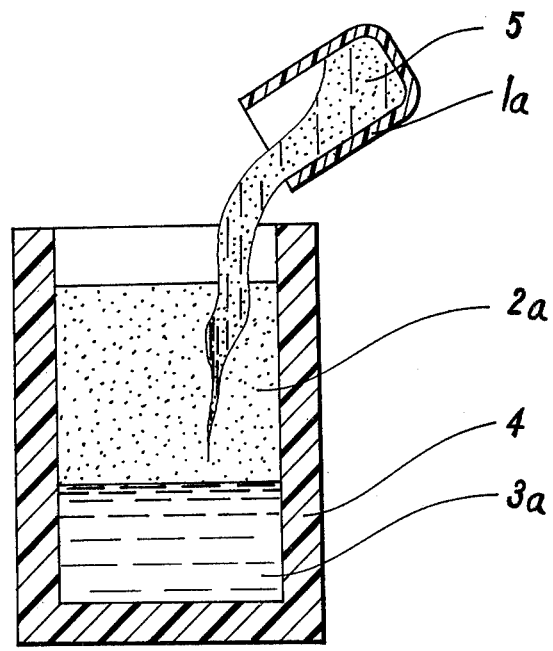

When such operations were repeatedly carried out as is the case with Example 1, the upper molten part in FIG. 3, that is, the molten aluminum layer gradually increased and, under this molten aluminum layer, tin gathered due to the difference in specific gravity between it and aluminum. In this case, gas was generated in the liquid metal and the liquid metal was stirred by the gas. Then, as shown in FIG. 4, the liquid metal 5 in the crucible 1a was poured into a vessel 4 such, for example, as an ingot case. As a result of this, the liquid metal was calmed in the ingot case 4 and separated into an upper layer 2a of aluminum and a lower layer 3a of tin.

As has been discribed in detail in the foregoing, the method of this invention is to recover useful metallic components such as copper, tin, lead, etc. from a closely layered member composed of a surface layer of copper or a copper or aluminum alloy and a back metal of steel through the use of a molten aluminum.

Accordingly, with the method of this invention, it is possible to make good use of chips and scraps resulting from the fabrication of bearings and hence achieve the reduction of the manufacturing cost of the bearing. Further, the method of this invention employs molten aluminum as a medium, and hence is very economical. Moreover, since differences in the metallurgical and physical properties of aluminum, copper, lead, tin, etc. are utilized for the recovery of the useful metallic components, the method of this invention is easy to practise.

With the method of this invention, copper is recovered in the form of an aluminum-copper alloy, i.e. an aluminum bronze and lead and tin are also recovered in the form of metallic simple substances or their alloys, so that they can be effectively used as they are.

Further, in the case where the liquid metal is poured into a vessel such as an ingot case after the surface layer of the closely layered member is dissolved in the molten aluminum, the liquid metal is calmed and the useful metallic components such as tin and the like are precipitated under the molten aluminum or aluminum-copper layer and separated therefrom, so that the efficiency of separation sharply enhanced.

It will be apparent thay many modifications and variations may be effected without departing from the scope of the novel concept of this invention.

We claim as our invention:

1. A method of recovering useful metallic components from a closely layered member comprising the steps of providing a closely layered steel substrate having a surface layer of a copper-aluminum-tin-lead alloy, immersing said layered steel substrate in a crucible containing molten aluminum to dissolve the surface layer and separate said surface layer from the substrate, whereby a lead-tin layer forms at the bottom of the crucible while an aluminum-copper layer forms at the top of the crucible, and separating the aluminum-copper layer from the lead-tin layer.

* * * * *